United States Patent
Croxford et al.

(10) Patent No.: US 12,353,963 B2
(45) Date of Patent: Jul. 8, 2025

(54) SELECTIVE BIT INVERSION IN STORAGE OPERATIONS FOR MACHINE LEARNING

(71) Applicant: Arm Limited, Cambridge (GB)

(72) Inventors: Daren Croxford, Swaffham Prior (GB); Sharjeel Saeed, Cambridge (GB); Rachel Jean Trimble, Grindleford (GB); Timothy Fawcett Milner, Cambridge (GB)

(73) Assignee: Arm Limited, Cambridge (GB)

( * ) Notice: Subject to any disclaimer, the term of this patent is extended or adjusted under 35 U.S.C. 154(b) by 1173 days.

(21) Appl. No.: 17/145,804

(22) Filed: Jan. 11, 2021

(65) Prior Publication Data

US 2022/0222569 A1    Jul. 14, 2022

(51) Int. Cl.
*G06N 20/00* (2019.01)
*G06F 3/06* (2006.01)

(52) U.S. Cl.
CPC ........... *G06N 20/00* (2019.01); *G06F 3/0604* (2013.01); *G06F 3/0653* (2013.01); *G06F 3/0673* (2013.01)

(58) Field of Classification Search
CPC ..... G06N 20/00; G06F 3/0604; G06F 3/0653; G06F 3/0673
See application file for complete search history.

(56) References Cited

U.S. PATENT DOCUMENTS

| | | | | |
|---|---|---|---|---|
| 2018/0284873 | A1* | 10/2018 | Appu | G06F 1/3225 |
| 2019/0392287 | A1* | 12/2019 | Ovsiannikov | G06N 3/08 |
| 2020/0342921 | A1* | 10/2020 | Jiang | G11C 8/16 |
| 2021/0097403 | A1* | 4/2021 | Park | G06T 1/20 |

OTHER PUBLICATIONS

Ghose et al. (What Your DRAM Power Models Are Not Telling You: Lessons from a Details Experimental Study, Dec. 2018, pp. 1-41) (Year: 2018).*

(Continued)

*Primary Examiner* — George Giroux
(74) *Attorney, Agent, or Firm* — EIP US LLP (57) ABSTRACT

A processing unit is provided which comprises volatile storage for storing machine learning data in binary representation, and a data processing engine communicatively coupled to the volatile storage. The processing unit is configured to selectively invert the bit values in binary representations of portions of the machine learning data when performing storage operations using the volatile storage. A computer-implemented method, and non-transitory computer-readable storage medium comprising instructions for executing the method are also provided. The method comprises receiving a request to perform a storage operation on the volatile storage using the machine learning data and performing the storage operation, including, selecting a portion of the machine learning data and inverting bit values in a binary representation of the selected portion. A computer-implemented method comprising receiving a request to store machine learning data on volatile storage and storing the machine learning data is also provided. Storing the machine learning data includes operating on at least a portion of the machine learning data to prioritize one of two potential bit values.

17 Claims, 7 Drawing Sheets

(56) References Cited

OTHER PUBLICATIONS

Gebregiorgis et al. (Aging Mitigation in Memory Arrays Using Self-controlled Bit-flipping Technique, Jan. 2015, pp. 231-236) (Year: 2015).*
Ahmad et al. (Low Leakage Fully Half-Select-Free Robust SRAM Cells With BTI Reliability Analysis, Sep. 2018, pp. 337-349) (Year: 2019).*
Maddah et al. (CAFO: Cost Aware Flip Optimization for Asymmetric Memories, Feb. 2015, pp. 320-330) (Year: 2015).*
Hollis (Data Bus Inversion in High-Speed Memory Applications, Apr. 2009, pp. 300-304) (Year: 2009).*
Gherman et al. (Binary Linear ECCs Optimized for Bit Inversion in Memories with Asymmetric Error Probabilities, Mar. 2020, pp. 298-301) (Year: 2020).*

* cited by examiner

SELECTIVE BIT INVERSION IN STORAGE OPERATIONS FOR MACHINE LEARNING

BACKGROUND OF THE INVENTION

Field of the Invention

The present disclosure relates to data processing. In particular, but not exclusively, the present disclosure relates to performing storage operations on machine learning data.

Description of the Related Technology

Neural networks have emerged as powerful tools for image processing, inference, machine learning, and related tasks. Processing data using a neural network generally involves a large number of multiply-accumulate (MAC) operations. For example, Convolutional Neural Network (CNN) architectures typically include multiple convolutional layers, each of which generates a feature map via convolutions between a data array and one or more kernels. Each feature map contains multiple elements, where each element is computed via a series of MAC operations between a subset of elements of the data array and respective weight values of a kernel. Neural networks may also comprise other layer types, for example, Fully Connected (FC) layers, Deconvolution layers, Recurrent layers, and so forth.

The MAC operations mentioned above account for a portion of the computational cost of performing inference or training for a neural network, both in terms of processing time and in terms of power required to switch bits within registers. Since MAC operations of the same type are performed repeatedly during inference or training, hardware accelerators have been developed which include arrays of specialized MAC units for this purpose.

Performing these MAC operations includes a large amount of data movement. Accessing the feature map data and weight value data for the kernels consumes a large proportion of the energy used to execute neural networks.

SUMMARY

According to a first aspect, there is provided a processing unit comprising volatile storage for storing machine learning data, wherein the volatile storage is configured to store machine learning data in binary representation; a data processing engine communicatively coupled to the volatile storage and for performing machine learning operations using the machine learning data, wherein the processing unit is configured to selectively invert bit values in binary representations of portions of the machine learning data when performing storage operations using the volatile storage, the storage operations comprising at least one of: writing portions of the machine learning data to the volatile storage; and reading portions of the machine learning data from the volatile storage.

According to a second aspect, there is provided a computer-implemented method for data processing, the computer-implemented method comprising: receiving a request to perform a storage operation on volatile storage using machine learning data, wherein the volatile storage is configured to store the machine learning data in binary representation; and performing the requested storage operation, wherein performing the requested storage operation includes: selecting a portion of the machine learning data based on at least one characteristic of the portion of the machine learning data; and inverting bit values in a binary representation of the selected portion of the machine learning data.

According to a third aspect, there is provided a non-transitory computer readable-storage medium comprising computer-executable instructions which, when executed by at least one processor, cause the at least one processor to: receive a request to perform a storage operation on volatile storage using machine learning data, wherein the volatile storage is configured to store the machine learning data in binary representation; and performing the requested storage operation, wherein performing the requested storage operation includes: selecting a portion of the machine learning data based on at least one characteristic of the portion of the machine learning data; and inverting bit values in a binary representation of the selected portion of the machine learning data.

According to a fourth aspect, there is provided a computer-implemented method comprising: receiving a request to store machine learning data on volatile storage, wherein the volatile storage is configured to store the machine learning data in binary representation; and storing the machine learning data on the volatile storage, wherein storing the machine learning data includes performing an operation on at least a portion of the machine learning data to prioritize one of two potential bit values in a binary representation of the portion of the machine learning data, wherein the bit value which is prioritized is a preferred bit value for the storage.

According to a fifth aspect, there is provided a non-transitory computer-readable storage medium comprising computer-executable instructions which, when executed by at least one processor, cause the at least one processor to: receive a request to store machine learning data on volatile storage, wherein the volatile storage is configured to store the machine learning data in binary representation; and storing the machine learning data on the volatile storage, wherein storing the machine learning data includes performing an operation on at least a portion of the machine learning data to prioritize one of two potential bit values in a binary representation of the portion of the machine learning data, wherein the bit value which is prioritized is a preferred bit value for the volatile storage.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein relate to a method for processing machine learning data in which portions of the machine learning data may be modified when performing storage operations such as reading and/or writing said portions of machine learning data to volatile storage. By modifying portions of machine learning data when performing storage operations, it is possible to store the machine learning data on the volatile storage using a higher proportion of a given bit value which requires less energy to read from the volatile storage than unmodified portions of the machine learning data. Portions of the machine learning data which are to be modified may be identified, or selected, based on their characteristics, such as data types used to represent data values in the machine learning data (including whether the data type is a signed or an unsigned data type), an average size, e.g. magnitude, or skew of the data values in the machine learning data, whether the machine learning data is compressed or decompressed, and characteristics of the volatile storage which cause a disparity between the energy required to read bit values of one and bit values of zero from the volatile storage. Any one of these criteria may be considered and/or a combination of these criteria may be used when identifying portions of the machine learning data which are to be modified, or processed.

Figure 1:
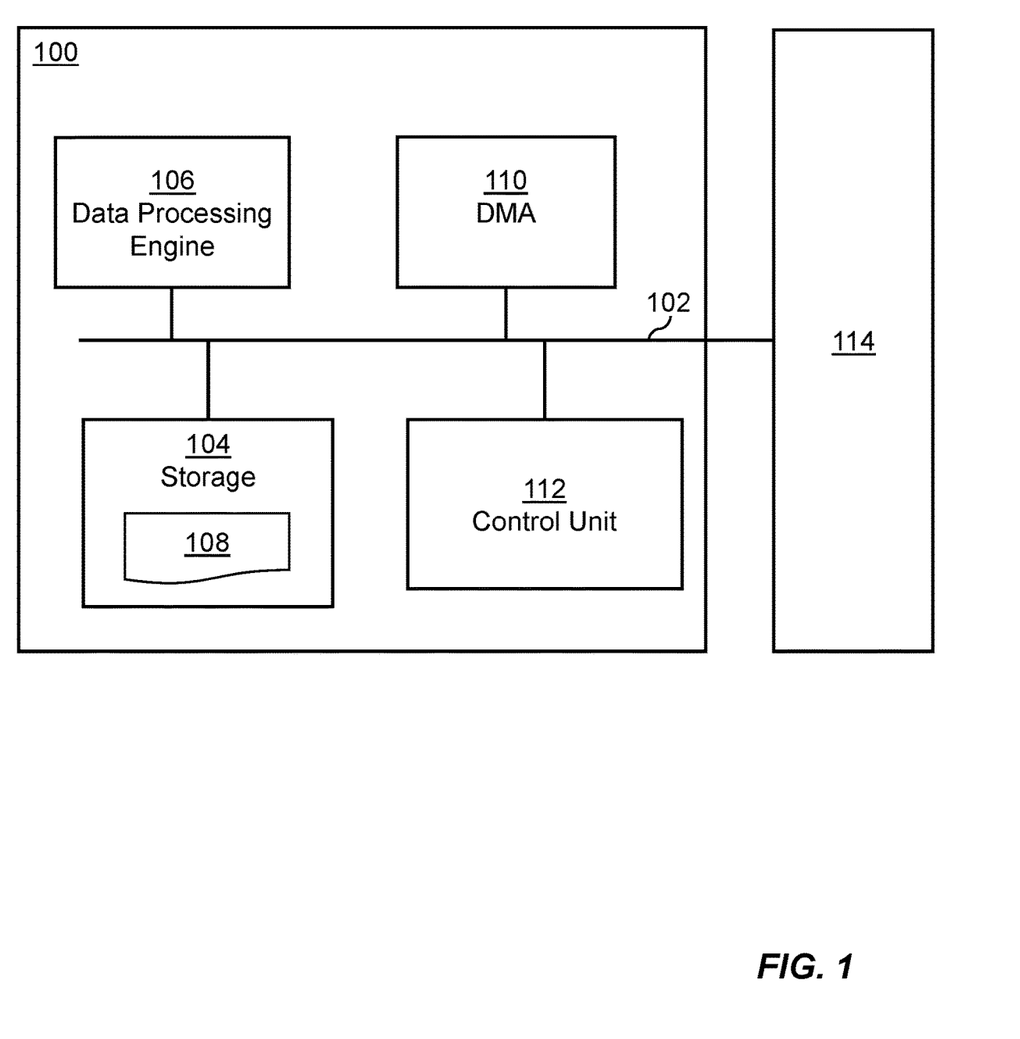
FIG. 1 is a schematic diagram showing a processing unit according to examples.

FIG. 1 shows an example of a processing unit 100 for processing data using machine learning techniques. The processing unit 100 may be a neural processing unit (NPU) which is a specialized integrated circuit for processing data in accordance with neural network architectures, for example, convolutional neural network (CNN) architectures. An NPU may also be referred to as a neural network accelerator (NNA), a convolutional neural network accelerator (CNNA), a machine learning accelerator, or an artificial intelligence accelerator. The following examples will be described with respect to an NPU, however, it will be appreciated that the methods described herein are also applicable to other types of processing units, including for example, graphics processing units, central processing units, and coprocessors.

The processing unit 100 comprises a data bus 102 connecting the elements included in the processing unit 100. The data bus 102 is also connected to an external memory 114. The external memory 114 may comprise volatile memory including dynamic random-access memory (DRAM) such as synchronous dynamic random-access memory (SDRAM), as well as non-volatile memory and storage, for example flash memory, a solid-state drive (SSD) and non-volatile random-access memory (NVRAM). The data bus 102 may also be connected to other components not shown in FIG. 1, for example, input/output devices, external processing units, such as a central processing unit or a graphics processing unit, network interfaces, and the like.

The processing unit 100 includes volatile storage 104 and a data processing engine 106. The volatile storage 104, which will be referred to hereafter as memory 104, in this example, includes static random-access memory (SRAM), for storing machine learning data 108 for use in implementing machine learning operations using the data processing engine 106 on the processing unit 100. The memory 104 may be used to implement a buffer, a cache, a tightly coupled memory, or other suitable functions in the processing unit 100. Machine learning data 108 may include input data, in the form of a data array. Input data may include data to be input to a first layer of a convolutional neural network, such as image data. Image data, for example, may include a two-dimensional input data array of 8-bit data values, with multiple channels, each channel representing one of red, green, or blue. The number of channels is referred to as the depth of the input data array. For example, a color image may be represented by a two-dimensional array with different in-plane positions representing different pixels, each pixel being represented by data values representing intensities of red, green, and blue light. Machine learning data 108 may also include input feature map (IFM) data which is data to be input to second and subsequent layers of a convolutional neural network. IFM data may be generated as an output, e.g. as output feature map (OFM) data, from a previous layer of a neural network. For example, OFM data generated as an output of layer of the convolutional neural network may be written to the memory 104, if the memory 104 has sufficient capacity, and processed as the IFM data for the next layer. If the memory 104 does not have sufficient capacity to store the OFM data, then the OFM data may be streamed to and from external memory 114.

As an example of a convolution layer, processing input data using machine learning techniques generally comprises performing convolutions between kernels and the input data. Machine learning data 108 may include weight data, wherein weight data includes weight values representing elements in at least one kernel. Convolutions are defined such that for a given position of a kernel relative to an input data array, MAC operations are performed in which each weight value of the kernel is multiplied by a coinciding data value of the input data array and the resulting products are summed to generate an element of an output data array. For the given position of the kernel, a dot product is thereby computed between the kernel and a respective subarray of the input data array. To generate the entire output data array, this dot product operation is performed for each of a predetermined set of positions of the kernel relative to the input data array, where the predetermined positions are separated by a fixed number of elements, referred to as a stride, in each in-plane direction of the array. The machine learning data 108 may include output data including, for example, output feature map (OFM) data, in the form of an output data array. Machine learning data 108 may also include data representing other suitable parameters such as bias, and stride information. Machine learning data 108 may generally be skewed to smaller values and/or zero values.

The memory 104 is arranged to store machine learning data 108 in binary representation. In other words, binary representations are used to store data values in the machine learning data 108. A binary representation of a data value comprises a plurality of bit values, each of which may be either a zero or a one, depending on the data value which is being represented and the format in which the data value is expressed. Binary representations of data values included in machine learning data 108 may be arranged in different formats, referred to as data types, for example, signed integer values, unsigned integer values, sign-magnitude, signed or unsigned fixed point, floating point numbers, and so forth. Some types of machine learning data 108 may have a preferential data type. For example, machine learning data 108 used in inferencing operations may typically be stored as unsigned and singed integers, e.g. one's complement, two's complement, or sign-magnitude representations, signed or unsigned fixed point, bfloat16, or float16 data types. Conversely, during training operations, machine learning data 108 may typically be stored, and processed, in float32 data type. The data types used in machine learning may generally be determined by the neural network architecture and/or the drivers.

The processing unit 100 includes a data processing engine 106. The data processing engine 106 includes processing circuitry arranged to perform MAC operations necessary to implement layer processing for a neural network architecture. In particular, the data processing engine 106 may be optimized for implementation of a convolution (or deconvolution) between an input feature map (IFM) or other data array (such as an image) and a kernel, to generate an output feature map (OFM) or other output data array.

The data processing engine 106 may also comprise processing circuitry arranged to perform post processing operations on OFM data generated by the MAC operations, including, for example, bias, pooling operations and applying activation functions. The circuitry arranged to perform post processing operations may be programmed to perform different operations for different layers within a given neural network, allowing a broad range of neural network architectures to be implemented. The processing circuitry for performing post processing on OFM data may be configured to output the OFM data to the memory 104. The processed OFM data may be stored in the memory 104 if the memory 104 has sufficient capacity.

The processing unit 100 is arranged to retrieve machine learning data 108, such as input data and weight data, from the external memory 114 using a direct memory access unit (DMA) 110. The machine learning data 108 retrieved from the external memory 114 may be stored on the local memory 104 to implement machine learning operations using the data processing engine 106. The processing unit 100 comprises a control unit 112 arranged to generate control data for the data processing engine 106. Memory access performed when implementing machine learning techniques is generally frequent and, in some case, repeated. Storing machine learning data 108 on the memory 104 included in the processing unit 100 may be desirable as it decreases the time taken to perform read and write operations, reduces load on the external memory 114, and reduces energy consumption, as compared to accessing external memory 114 on demand when performing machine learning operations.

In an example, the processing unit 100 is used to perform inference on an image in accordance with a neural network architecture including multiple convolutional layers. A convolutional layer of the neural network may include multiple kernels and therefore implementing each convolutional layer may involve multiple convolution operations. Machine learning data 108, including the image data along with weight data corresponding to a kernel of the first convolutional layer of the neural network, is retrieved from the external memory 114. Both the image and the kernel are transferred to the memory 104 of the processing unit 100. The data processing engine 106 performs a convolution between the image and the kernel to generate OFM data, which is stored in the memory 104. The OFM data may be used as IFM data when implementing convolutions for a subsequent layer of the neural network, or as inputs to other neural network layer types, for example a fully connected layer.

While a single data processing engine 106 is shown in the example illustrated by FIG. 1, it will be appreciated that the processing unit 100 may comprise a plurality of data processing engines. The plurality of data processing engines may each have their own volatile storage, or memory, or may share one or more memories.

Figure 2:
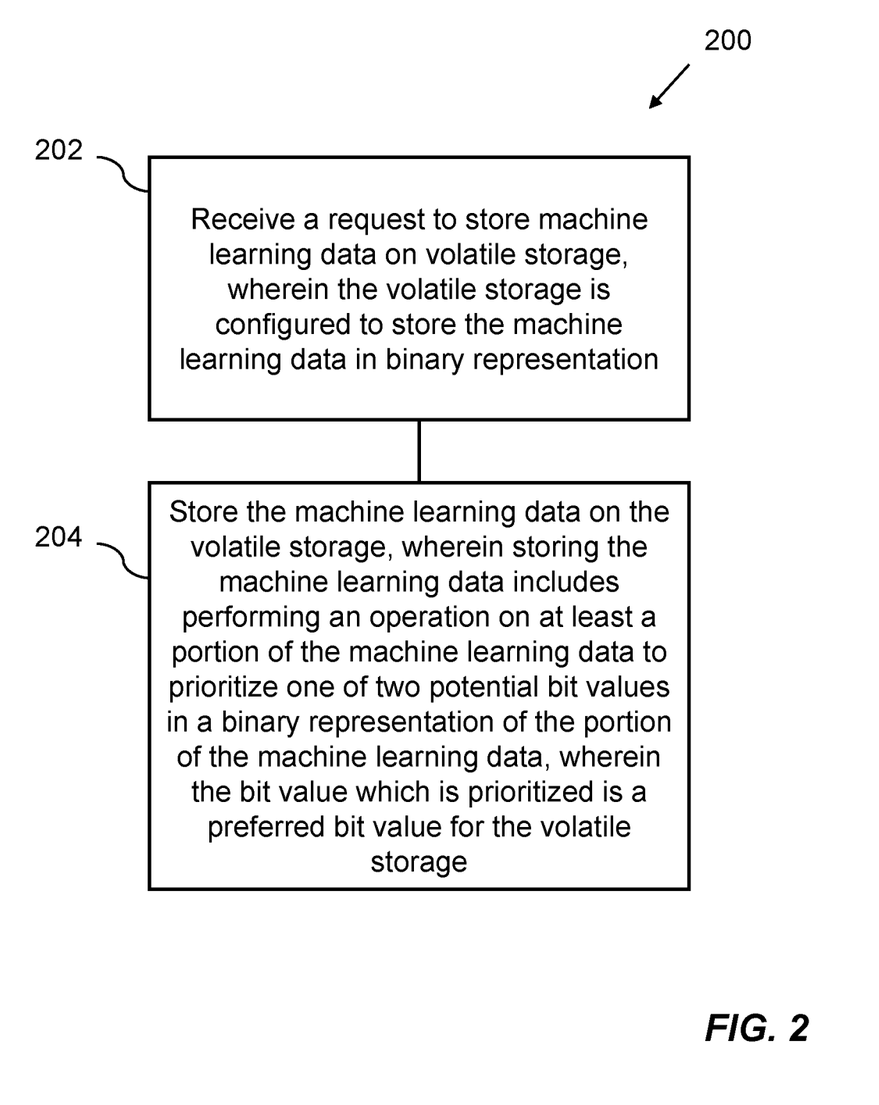
FIG. 2 is a flow chart illustrating a computer-implemented method for data processing according to examples.

FIG. 2 illustrates a method 200 for data processing in the processing unit 100. At a first block 202, the processing unit 100 receives a request to store machine learning data 108 on the memory 104. For example, as described above, the processing unit 100 may receive a request to read machine learning data 108 from the external memory 114 and store the machine learning data 108 on the memory 104, by writing the machine learning data 108 to the memory 104.

Receiving the request to store machine learning data 108 on the memory 104 may include receiving a request, originating from a user of a computing device comprising the processing unit 100, to perform a machine learning process using the processing unit 100. The request may alternatively relate to an internal signal between the data processing engine 106 and the DMA 110.

At block 202, the processing unit 100 stores the machine learning data 108 on the memory 104, for example the DMA 110 may read the machine learning data 108 from the external memory 114 and write the machine learning data 108 to the memory 104. When storing the machine learning data 108, the processing unit 100 is configured to perform an operation on at least a portion of the machine learning data 108 to prioritize one of the two potential bit values in a binary representation of the portion of the machine learning data 108. The operation which is performed on the machine learning data 108 may include inverting bit values in the binary representation of the machine learning data 108, applying compression algorithms which prioritize one of the two potential bit values, suitable combinations of compression and inversion operations, or performing other suitable operations such as performing one or more arithmetic operations on data values represented by the machine learning data 108. The operation which is performed on the machine learning data 108 may be performed before writing the machine learning data 108 to the memory 104, or as the machine learning data 108 is written to the memory 104.

It has been found that storage operations occurring within the processing unit 100, for example, reading and writing input data, input feature map data, output feature map data, and weight data from the memory 104 to perform convolutions in the data processing engine 106, can utilize a significant proportion of the total energy required to power the processing unit 100. The amount of energy used to perform storage operations, such as reading data from memory 104, is generally dependent on the architecture of the memory 104 and the values which are being read from the memory 104. When performing operations on at least some of the machine learning data 108 to prioritize one of the two potential bit values in the binary representation, the bit value which is prioritized is a preferred bit value for the memory 104. A preferred bit value for the memory 104 refers to a bit value which requires the least amount of energy to be used when reading the bit value from the memory 104. That is to say a preferred bit value is a bit value which causes less energy to be dissipated when the bit value is read from the memory 104, than the other of the two potential bit values. By processing the machine learning data 108 to prioritize a preferred bit value, it is possible to reduce the amount of power used to perform read operations when processing the machine learning data 108 using the data processing engine 106. As discussed above, performing machine learning operations on the machine learning data 108, using the data processing engine 106, may include repeatedly reading at least some of the machine learning data 108 from the memory 104. In this case, storing the machine learning data 108 in a format which requires less power to read from memory 104 will reduce the power requirements for every subsequent read operation of that portion of the machine learning data 108.

Implementing machine learning techniques in the processing unit 100 generally requires high-speed access of the memory 104 to read data to be provided to the data processing engine 106. Consequently, types of memory used in processing units 100 generally utilize sense-amplifying schemes which include pre-charging. This is the case for various types of memory including SRAM, DRAM, and so forth. Where a memory 104 implements pre-charging, bit-lines are charged to a reference voltage every clock cycle in preparation for a next operation. When reading data from the memory 104, a wordline, corresponding to the data which is to be read, is activated, and storage elements are used to drive bitlines to read the bit value stored in the memory cell. Storage elements may vary depending on the type of memory 104 which is being used. In the case of SRAM, the storage elements are active elements such as latches. In other examples, such as with DRAM, the storage elements are passive elements such as capacitors. Where pre-charging is used there is a disparity between the energy required to read a bit value of zero and a bit value of one from a memory cell. Generally, bit values which conform to the pre-charging bit value of the memory cell require less power to read than bit values which do not conform to the pre-charging bit value. The bit value of the two potential bit values which is a preferred bit value for the memory 104, can be determined by evaluating the power or current required to read and write a bit value of one and a bit value of zero to the memory 104. The current required in each case is asymmetric, and so the current required for one of these two bit values will be higher than for the other of the two bit values. It has been found that, for some memory architectures, the difference in energy required to read a bit value of zero from a memory cell can be 15% lower than the energy required to read a bit value of one from a memory cell, which represents a significant proportion of energy, in particular, given the large number of bit values which are stored and accessed in memory 104.

Once the machine learning data 108 is stored in the memory 104, reading the machine learning data 108 from the memory 104 to perform machine learning techniques may include performing one or more operations on the machine learning data 108, in order to undo the operations performed during the storage operation to prioritize one of the two bit values. For example, where processing a portion of the machine learning data 108 includes inverting bit values in a binary representation of the portion of the machine learning data 108, reading the machine learning data 108 from the memory may include inverting the bit values in the binary representation of the portion of the machine learning data 108, which were previously inverted when storing the portion of machine learning data in the memory 104. Alternatively, the data processing engine 106 may be configured to process the machine learning data 108 in the form in which it is stored in the memory 104. For example, the neural network implemented by the data processing engine 106 may be configured to process at least some of the machine learning data 108 with bit values in the binary representations of the machine learning data having been being inverted. Where the machine learning operations include MAC operations, the processing unit 100 may be configured to perform the multiply operations using inverted data, and then perform bit value inversions before accumulating the result.

Figure 3:
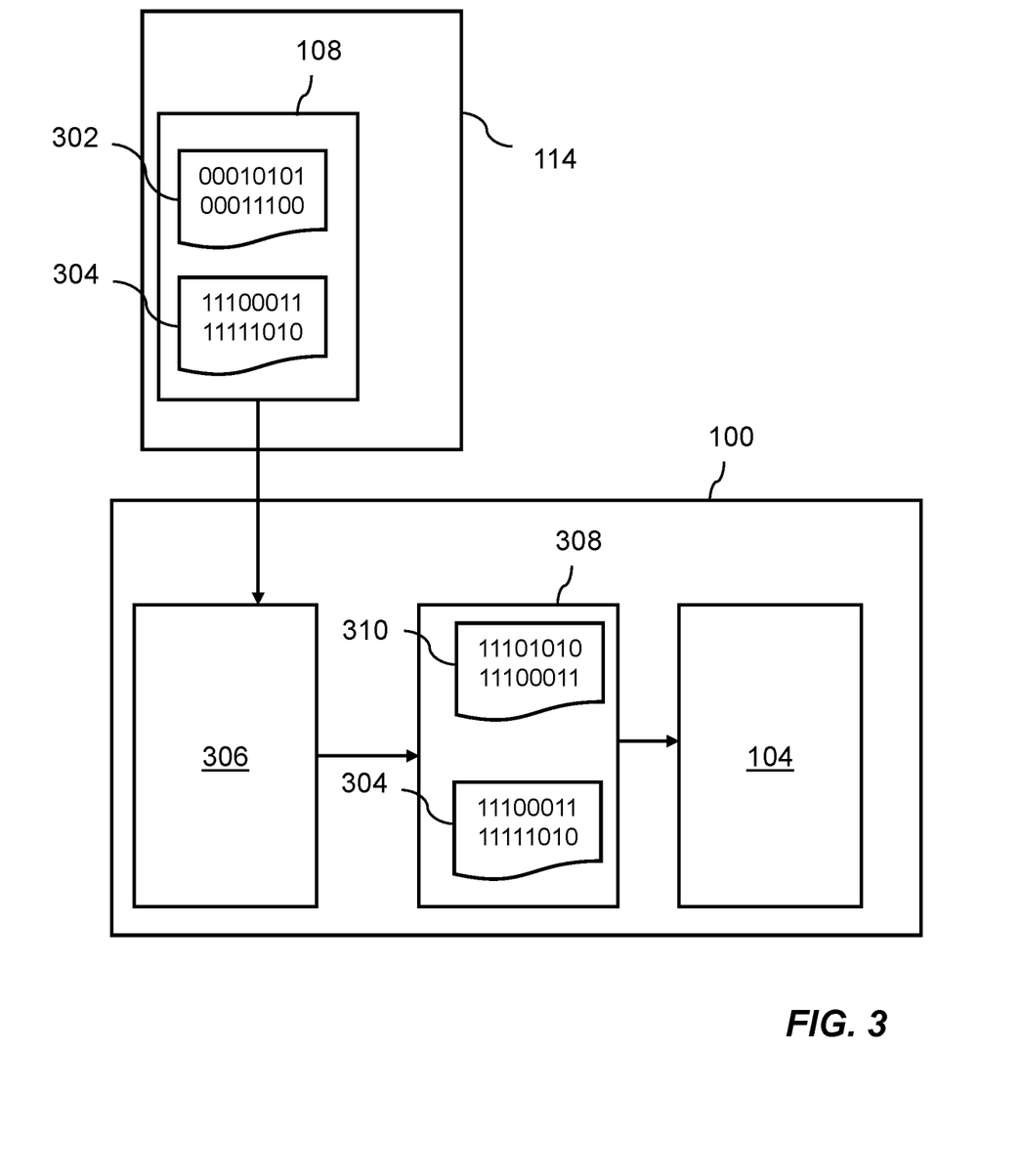
FIG. 3 is a schematic diagram illustrating a computer-implemented according to examples.

FIG. 3 shows an example of the method 200 in which the operation performed on the machine learning data 108 to prioritize one of the two potential bit values is an inversion of at least some of the bit values in the binary representation of the machine learning data 108. Machine learning data 108, stored in external memory 114, comprises a first portion 302 of machine learning data including a plurality of data values. Binary representations of two such data values are shown in the example of FIG. 3, however, it will be appreciated that more than two data values may be included in the first portion 302. The machine learning data 108, also comprises a second portion 304 of machine learning data including a plurality of data values. Binary representations of two data values of the second portion 304 are shown in the example of FIG. 3, however, it will be appreciated that more than two data values may be included in the second portion 304. The data values shown in FIG. 2 are unsigned integers stored in an 8-bit binary representation.

A request to store the first portion 302 and second portion 304 of machine learning data 108 on the volatile storage 104 may be received. In this example, the volatile storage 104 has a preferred bit value of one as, when reading bit values from the volatile storage 104, bit values of one will require less energy to read than bit values of zero. This may be the case, for example, where the volatile storage 104 includes SRAM comprising one or more four transistor (or 4T) memory cells. The processing unit 100 is configured to read the portions 302, 304 of machine learning data from the external storage 114 and, at block 306, to selectively invert bit values in binary representations of portions 302, 304 of the machine learning data 108 when storing the portions 302 and 304 on the memory 104. Selectively inverted machine learning data 308 is generated in which the bit values of the binary representations of the data values in the first portion 302 of machine learning data are inverted to generate a first inverted portion 310, and the bit values in binary representations of the data values in the second portion 304 of the machine learning data are not inverted. The selectively inverted machine learning data 308 is stored on the volatile storage 104. As described above, data values included in machine learning data 108, such as weight values, data values in OFM data and IFM data, are often small or zero. Consequently, this skew to smaller or zero values may be exploited when selectively inverting, or otherwise operating on, the machine learning data 108.

While the portions 302 and 304 of machine learning data 108 shown in FIG. 3 each comprise multiple data values, in some cases, a portion of machine learning data 108 may refer to a single data value, or parts of a binary representation of a single data value in the machine learning data 108. For example, where the machine learning data 108 comprises data values stored as floating-point numbers, a portion of the machine learning data 108 which is selected may refer to the exponent of the floating point representation of a given data value in the machine learning data 108.

In examples where the portions of machine learning data 302 and 304 are selectively inverted inside the processing unit 100, the processing unit 100 may comprise a data inversion unit, connected at one or more interfaces of the memory 104, for inverting bit values of binary representations of the portions of the machine learning data 108. The data inversion unit may be controllable, such that some portions of machine learning data 108 pass through the data inversion unit without being inverted, whilst other portions of the machine learning data 108 are selectively inverted when passing through the data inversion unit. An example of a data inversion unit includes an Exclusive OR (or XOR) gate. The XOR gate may be included as part of the data bus 102. An XOR gate is a digital logic gate that will give a true (e.g. 1 or HIGH) output when the number of true inputs is odd, and gives a false (e.g. 0 or LOW) output when the number of true inputs is even (e.g. 0 or 2). The XOR gate may be configured in the processing unit, such that a first input of the XOR gate is an input through which machine learning data 108 is provided to the memory 104. A second input of the XOR gate may be a control signal input, such that by changing the control signal at the second input (e.g. from 0 to 1, LOW to HIGH), it is possible to invert the output of the XOR gate as compared to the signals input at the first input of the XOR gate. The XOR gate may be controlled by the control unit 112. For example, when a particular machine learning process is to be implemented by the data processing engine 106, the control unit 112 may generate control signals which control the XOR gate during write operations, and in some examples read operations where for example, an XOR gate is connected to an output of the memory 104. The control unit 112 may be configured to select portions of the machine learning data 108, based on characteristics of the selected portions of machine learning data 108, and to control the data inversion unit to invert bit values in a binary representation of the selected portion of the machine learning data 108.

Machine learning data 108 may be stored in the memory 104 in a compressed form or in a decompressed form. In examples where the machine learning data 108 is stored in the memory 104 in a compressed form, the performing operations on the machine learning data to prioritize a bit value may include compressing at least some of the machine learning data 108. Different compression techniques, when applied to data, may introduce biases into the binary representation of said data to either zeroes or ones. By applying a compression technique to the machine learning data 108 which introduces a bias to a preferred bit value for the memory 104 it becomes possible to store the machine learning data 108 in a form which requires less energy to read from the memory 104. Some types of machine learning data may be more suitable for certain types of compression than others. For example, machine learning data 108 to be used in inferencing may be compressed using lossy compression without significant impact to the result. Whereas other types of machine learning data 108, such as machine learning data 108 to be used in training, may not be suitable for applying lossy compression. Where some of the machine learning data 108 is stored in the memory 104 in a compressed format, it may also be processed by the data processing engine 106 in a compressed format. Alternatively, processing the machine learning data 108 using the data processing engine 106 may include decompressing the machine learning data 108.

While the examples described above relate to examples where the machine learning data 108 is read from external memory 114 and written to the memory 108, it will be appreciated that the above methods are equally applicable to examples in which the machine learning data 108 is output data, such as OFM data, and the machine learning data 108 is generated by the data processing engine 106 and written to the memory 104.

Processing the machine learning data 108 to prioritize one of the two potential bit values in the binary representation of the machine learning data 108 may be performed outside of the processing unit, for example, operations may be performed on the machine learning data 108 after it has been read from the external memory 114 and before being provided to the DMA 110. In this respect, one or more further processing units may be provided for operating on portions of the machine learning data to prioritize a bit value in the binary representations of the machine learning data 108.

While the examples described above relate to the processing of machine learning data 108 when storing the machine learning data 108 in the memory 104, in some examples, operations to modify bit values in the machines learning data 108 are performed when reading and/or writing the machine learning data 108 to the memory.

Figure 4:
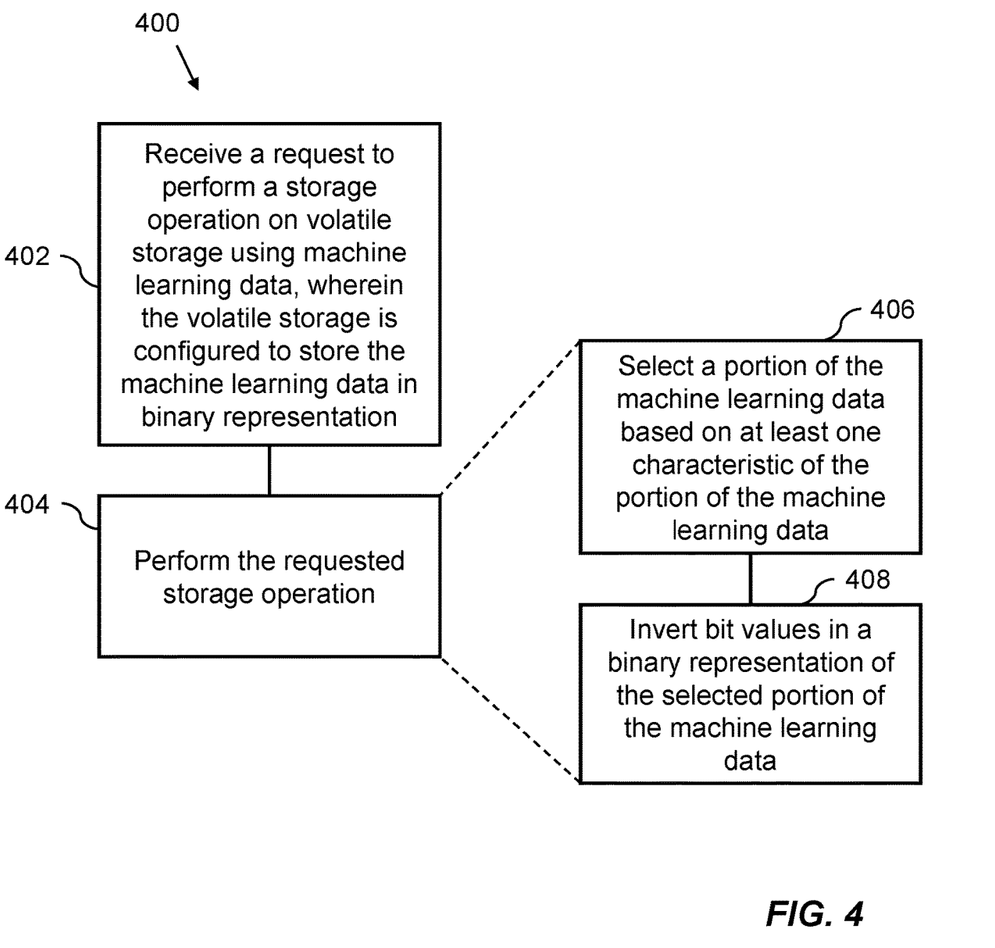
FIG. 4 is a flow diagram illustrating a computer-implemented method for data processing according to examples.

FIG. 4 shows an example of a method 400 of data processing relating to read and/or write operations. In the example shown in FIG. 4, bit values in binary representations of portions of machine learning data are selectively inverted. The method 400 includes at a first block 402, receiving a request to perform a storage operation on volatile storage, or memory, 104 using machine learning data 108. The storage operation may include a read operation and/or a write operation. For example, the storage operation may include reading machine learning data 108 from the memory 104, writing machine learning data 108 to the memory, or a combination of both reading and writing machine learning data 108. At a second block 404, the method includes performing the requested storage operation using the machine learning data 108, wherein performing the requested storage operation includes selectively inverting bit values in binary representations of portions of the machine learning data 108, as shown in blocks 406 and 408. Selectively inverting the bit values of the binary representations includes, at block 406, selecting a portion of the machine learning data based on at least one characteristic of the portion of the machine learning data and, at block 410, inverting bit values in a binary representation of the selected portion of the machine learning data 108.

Figure 5:
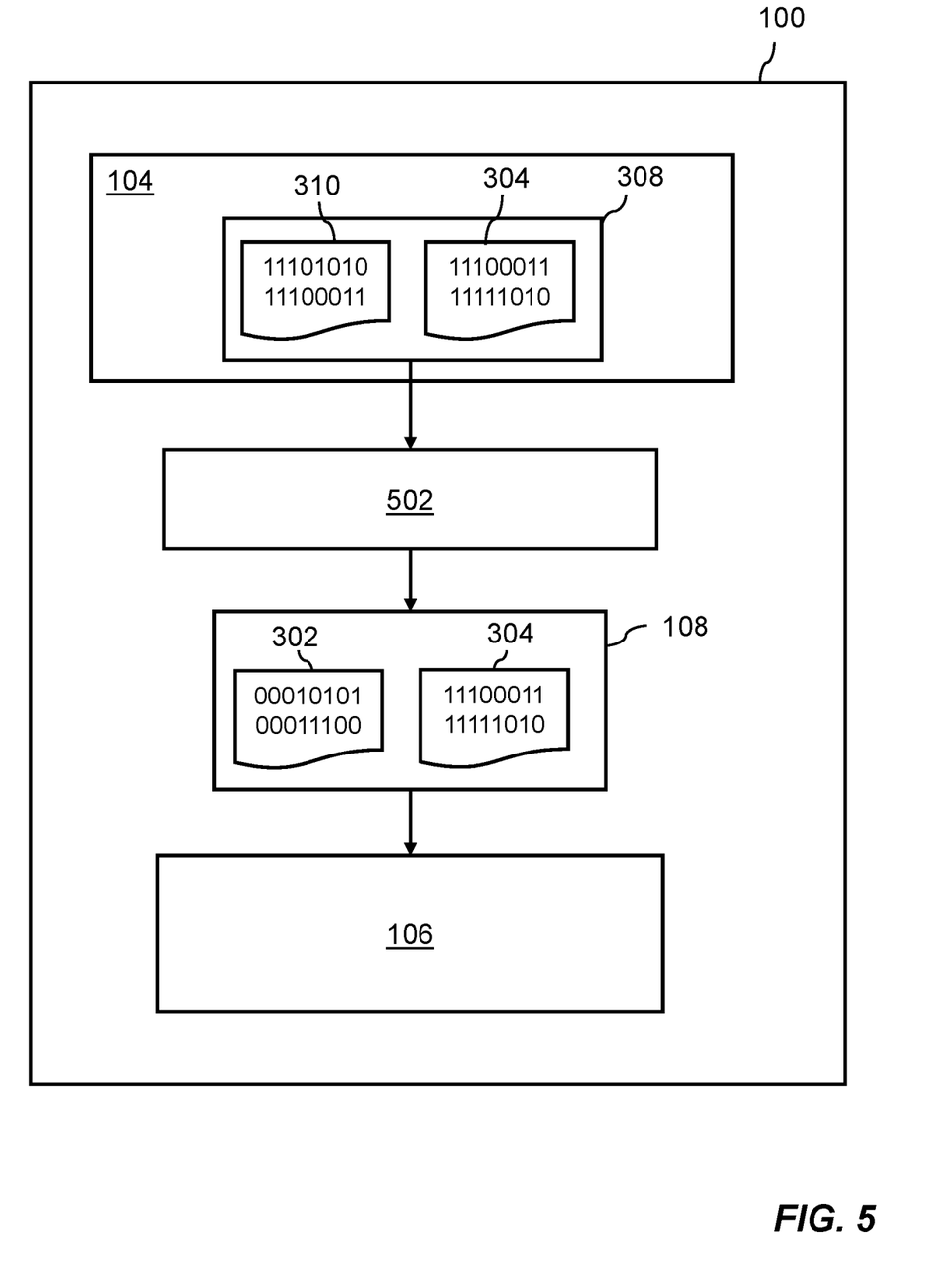
FIG. 5 is a schematic diagram illustrating a computer-implemented method according to examples.

For example, machine learning data may be stored in the memory 104 in accordance with the example illustrated in FIG. 3. In this case, the machine learning data 308 stored in the memory 104 is selectively inverted machine learning data 308. When implementing a machine learning technique using the data processing engine 106, the method 400 shown in FIG. 4 may be used to read the selectively inverted machine learning data 308 from the memory 104. FIG. 5 shows schematically a process in which the selectively inverted machine learning data 308 is stored in the memory 104. A request to read the selectively inverted machine learning data 308 from the memory 104 may be received, for example from the data processing engine 106. The selectively inverted machine learning data 308 may be read from the memory 104 and at a block 502 may be selectively inverted. The second portion 304 of machine learning data which was not inverted when being stored in the memory 104, is not selected and not inverted. The inverted portion 310 of machine learning data is selected at the block 502 and the binary representations of this portion 310 are inverted to restore the original data values of the first portion 302 of machine learning data 108. The machine learning data 108 is then provided to the data processing engine 106.

In some examples, the portions of machine learning data which are selected according to the method 400 shown in FIG. 4, are portions of machine learning data which have previously been stored in the memory 104 in an inverted form. In this way, the machine learning data 108 can be processed by the data processing engine 106 without making modifications to the configuration of the data processing engine 106 to account for differences in the form in which the machine learning data 108 is stored in the memory 104.

In another example, the method 400 shown in FIG. 4 may be used when the machine learning data 108 is being exported from the memory 104 to the external memory 114. As the data processing engine 106 performs machine learning operations it may generate output data, such as OFM data, which is stored in the memory 104. The output data may be selectively inverted according to the method 200 shown in FIG. 2 when being stored in the memory 104. In this case, when the OFM data is being read from the memory 104 to be written onto the external memory 114 it may be selectively inverted to undo the selective inversion performed on the OFM data when storing it in the memory 104. Where the OFM data is to be used as IFM data for subsequent layers of the neural network, inverting bit values in the binary representation of at least part of the OFM data may allow subsequent read processes to be performed with reduced energy expenditure.

In some examples, portions of machine learning data 108 which are to be operated on, for example by inverting bit values in binary representations, may be selected based on at least one characteristic of the portion of machine learning data 108. A characteristic of a portion of machine learning data 108 may include information represented by the portion of machine learning data 108. Information represented by the portion of machine learning data 108, may include the magnitude of data values included in the portion of machine learning data 108, which may be evaluated on a per data value basis or as an average of the all data values included in the portion of machine learning data 108. Additionally, or alternatively, the information represented by the portion of machine learning data 108 may relate to how the portion of machine learning data 108 is to be used to implement the neural network.

For example, portions of machine learning data 108 which represent weight values for the kernels in the neural network may be selected. This may be due to the weight values for the neural network being skewed to particular values (such as small numerical values or zero) such that inverting bit values in the binary representation of these values introduces a bias to the preferred bit value for the memory 104, in the binary representation. In other words, the binary representation of the weight values in the weight data may be skewed to either zeroes or ones, and hence may represent strong candidates for inversion. For small numerical values represented as signed numbers, in either of one's complement or two's complement, selectively inverting the bit values will effectively convert the binary representation from a small signed value to a large unsigned value. A header in a data stream including the weight data may comprise metadata indicating that the weight data is to be selected to be operated on, e.g. by inverting bit values in the binary representations. This may be the case where, for example, the weight data is stored in a particular data format, the weight data represents skewed data values such as low or zero values, and/or where the weight data has previously been operated on to prioritize one of two potential bit values in the binary representations.

Alternatively, or additionally, the header may include metadata indicating that the subsequent data stream includes weight data, and the processing unit 100 may determine that weight data is to be operated on during storage operations, e.g. inverting bit values in the binary representations, and hence selects the data stream including said weight data.

IFM data for the neural network may similarly be selected if the data values in the IFM data are skewed to particular values, such that inverting bit values in the binary representation of these data values introduces a bias to the preferred bit value for the memory 104, or, where the IFM data is being read from the memory 104, reverses the operation previously performed on the IFM data to prioritize one of the two potential bit values. Characteristics of machine learning data 108, such as the skew of the data values in the machine learning data 108, and the differences in skew between, for example input data and weight data, may be dependent on the neural network architecture.

Portions of input data, such as image data, may also be selected to have bit values in the binary representations included in said portions of input data inverted. For example, data values in the input data may be skewed to either small or large values. This may be the case where the input data includes image data. Image data captured by a security camera during the day may generally comprise larger values, due to higher exposures. Image data captured during the night may generally comprise lower values, due to lower exposures. The processing unit 100 may determine a skew of data values in the input data, and may select portions of the image data which are to be inverted, or otherwise operated on to prioritize one of two potential bit values in the binary representations included in the portions of image data.

In some cases, the selection of portions of machine learning data 108 based on the information represented by the selected portions of machine learning data 108 may be predetermined. For example, a driver may indicate that all portions of weight data in the machine learning data 108 should be selected to be inverted. In this case, whenever weight data is identified when storing and/or reading from the memory 104 said weight data is inverted. Alternatively, the driver may indicate that all portions of weight data associated with one or more specific layers in the neural network should be selected to be inverted. Pre-determining which portions of machine learning data 108 are to be operated on, for example, selectively inverted, when storing in and/or reading from memory 104 may mitigate an increase in power which would be spent identifying portions of the machine learning data 108, on demand, to be inverted. The portions of machine learning data 108 on which operations are performed, e.g. to prioritize a bit value, may be determined by the architecture of the neural network and as such, when configuring the data processing engine 106 to implement a neural network the processing unit 100 may also be configured to select certain portions of the machine learning data 108.

A characteristic of a portion of machine learning data 108 may additionally, or alternatively, include a data type of the said portion of machine learning data 108. As discussed above, machine learning data 108 may be stored in different data types in dependence on, for example, a configuration of the neural network. Data types used in the machine learning data 108 impact the number of each of the two potential bit values which are present in the binary representations of each data value. In some cases, certain data types may generally introduce biases to a given bit value when used in machine learning data 108. For example, where a set of data values include only numbers below 31, but the set of data values are all stored as 32 bit integers, the majority of bit values in the binary representation of each data value in the set will be a zero. In examples where the memory 104 requires more energy to read a zero than a one, the machine learning data 108 may be operated on to invert bit values in the binary representations of the set of data values such that the majority of bit values are ones when storing the machine learning data 108 in the memory 104.

In some examples, a combination of two or more characteristics are used to determine whether to selectively invert bit values in binary representations of portions of the machine learning data 108. For example, a combination of data type and the data values included in the portions of machine learning data may be considered when selecting portions of the machine learning data 108 to selectively invert, or otherwise operate on. Where a portion of the machine learning data 108 comprises signed data values represented in a two's complement format there may be a predominance of small values. A value of one, in this case, would be represented as "000 0001" and negative one would be represented as "1111 1111". One of these two values would be less optimal for storage than the other, due to the predominance of either zeros or ones in the binary representation. In this case, one of these data values could be selected for inverting the bit values, in order to optimize the storage. Characteristics of machine learning data 108 may be shared amongst a plurality of portions of the machine learning data 108. In one instance, weight data to be used to implement a plurality of layers of a given neural network may have consistent characteristics across all the weight data. In this case, all portions of machine learning data 108 representing weight data may be selected. Alternatively, the characteristics of weight data may be different for portions of weight data to be used to implement different layers of the given neural network. In this case, weight data which is selected may be weight data associated with a specific layer or layers of the neural network. In another example, the characteristics of weight data representing different kernels in a single layer may be different. In this case, the weight data may be selected on a kernel by kernel basis. In other words, weight data representing a first kernel in a given layer may be selected while weight data representing a second kernel in the same layer may not be selected. Similarly, characteristics of IFM data may be consistent across all IFM data, or across IFM data which is to be used as an input to a specific layer of the neural network. In this case, the selection of portions of IFM data may be made across all IFM data or on IFM data for a specific layer or layers. The same may also be true for OFM data.

Where the machine learning data 108 can be arranged in categories sharing the same characteristics, a static selection of the portions of the machine learning data 108 may be used. For example, where all weight data shares the same characteristics, or at least some of the same characteristics, the processing unit 100 may be configured to select all weight data to be operated on to prioritize one of the two bit values in the binary representations. Where some or all of the characteristics are shared across IFM data and weight data, the processing unit 100 may select both the IFM data and weight data to be operated on to prioritize one of the two bit values in the binary representations. This may also be the case for OFM data, input data, and any combination of these different types of machine learning data 108 (IFM data, OFM data, input data, and weight data).

In this case, the portions of machine learning data 108 which are to be selected may be determined when configuring the data processing unit 106 to perform machine learning techniques. Performing a static selection, in other words having a static rule for selecting portions of machine learning data 108, may mitigate an increase in the amount of processing which would otherwise be performed in dynamically selecting portions of machine learning data 108, for example, based on data values represented by said portions of the machine learning data.

Characteristics of machine learning data 108 may additionally, or alternatively, include compression algorithms applied to machine learning data 108. For example, where a compression algorithm has been applied to a portion of the machine learning data 108, the number of values in the binary representations of the portion which have a bit value of zero may be increased. In this case, the portion machine learning data 108 may then be selected and operations performed, such as inverting the bit values, to reduce the number of zeros in the binary representation. In some examples, a portion of machine learning data 108 may not be selected if compression techniques have been applied.

Characteristics of machine learning data may additionally, or alternatively, include operations to be performed on the said portion of machine learning data. For example, where a portion of machine learning data 108 is to be compressed using a given compression technique, the decision as to whether to select a portion of machine learning data 108 may be sensitive to the compression technique which is to be performed. In some examples, operating on a portion of machine learning data 108 to prioritize one of the two potential bit values in the binary representation may make higher compression ratios possible. Alternatively, operating on a portion of the machine learning data 108 to prioritize one of the two potential bit values in the binary representation may negatively impact the compression ratios which are possible to achieve with a given compression technique. In this case, the portion of machine learning data 108 may not be selected so as to mitigate an impact on the subsequent compression techniques which are to be performed.

Compression techniques, including either of compression or decompression, may be applied to machine learning data 108 at various points including, for example, as the machine learning data is being read into the processing unit 100 and stored in the memory 104, as machine learning data 108 is being stored in the memory 104 after being generated at the data processing engine 106, and as machine leaning data 104 is being exported from the processing unit 100 and stored in the external memory 114. The selection of a portion of machine learning data to be operated on to prioritize a bit value, may be sensitive to compression techniques which are to be performed at any time.

Portions of machine learning data 108 on which operations to prioritize a bit value are to be performed may be selected dynamically. For example, the control unit may determine characteristics of the machine learning data 108 during processing and select portions of machine learning data 108 on the basis of this determination. The processing unit 100 may identify when data values in the machine learning data 108 which skew to low (or high) values are being processed and may update the control signals used to control the data inversion unit. While actively determining characteristics of the machine learning data 108, such as data values represented by the machine learning data 108, may increase the power and compute used in the processing unit 100, it becomes possible to store a greater proportion of the machine learning data 108 in the memory 104 in a form which is more energy efficient to read from the memory 104. As read operations performed on machine learning data 108 in the memory 104 are often repeated, the expenditure of energy and/or compute power in an initial storage process which includes dynamically selecting the portions of machine learning data 108, can be outweighed by the energy savings achieved during the multiple read operations performed on the machine learning data 108 when performing machine learning techniques using the data processing engine 106. In some cases, the dynamic selection of portions of machine learning data 108 may be performed periodically and not continuously. For example, a periodic determination of characteristics of the portions of the machine learning data 108 may be performed at a rate which mitigates an increase in processing power while also providing a more accurate selection of portions of the machine learning data 108 to be inverted. The rate at which determinations of characteristics of the portions of machine learning data 108 are made, may be dependent on a time between making said determinations, or a quantity of machine learning data 108 which is processed between making said determinations.

In some examples, a combination of a static rule for selecting portions of machine learning data 108 may be combined with a dynamic selection. In this case, the processing unit 100 may initially be configured to select portions of machine learning data 108 which include weight data. The processing unit 100 may also be configured to periodically process machine learning data, such as weight data, to identify whether any characteristics have changed. For example, if the skew of data values in the weight data has changed, such that the operations to prioritize one of the two potential bit values result in the weight data being stored in the memory with more bit values which are non-preferred bit values than bit-values which are preferred bit values, the processing unit 100 may stop selecting weight data.

As described above, a preferred bit value for the memory 104 may be dependent on the architecture of the memory 104. In some cases, the memory 104 in the processing unit comprises a plurality of different memories, each being the same type. In this case, when performing operations on portions of machine learning data 108 to prioritize one of the two potential bit values, the bit value which is prioritized may be set statically and applicable to all storage operations, for example, the processing unit 100 may be configured according to the characteristic of the memory 104 which determines which of the two potential bit values is a preferred bit value. Alternatively, one or more characteristics of the memory 104 may be determined during operation of the processing unit 100, for example, an indication of the characteristic of the memory 104 may be stored in software programmed register and the processing unit 100 may determine the characteristic of the memory 104 based on the stored indication. In other examples, the processing unit 100 may receive an input, e.g. from an external processor, which indicates the characteristic of the memory 104.

In other examples, the memory 104 may comprise a plurality of sub-memories, which may include different types of memory and may be different sizes. For example, a plurality of different types of SRAM may be included the NPU 100, at least two of the SRAMs having a different preferred bit value. Where this is the case, the processing unit 100 may select portions of machine learning data 108 based one or more characteristics of the memory 104. For example, operating on a portion of machine learning data 108 to prioritize a bit value of zero may be suitable for one SRAM, it may not be suitable for another SRAM in the memory 104. Hence the selection of a portion of machine learning data 108 may be based one or more characteristics of the memory, or volatile storage, 104. Characteristics of the memory 104 may include, for example, a type of at least one sub-memory of the plurality of sub-memories in the memory 104, a preferred bit value for the at least one sub-memory of the plurality of sub-memories in the memory 104 and so forth. In some examples, an indication of one or more characteristics of the memory 104 may be maintained in a software programmed register. The processing unit 100 may be configured to determine the characteristic(s) of the memory 104 based on the indication and to select portions of machine learning data 108 based at least on the indication.

Figure 6:
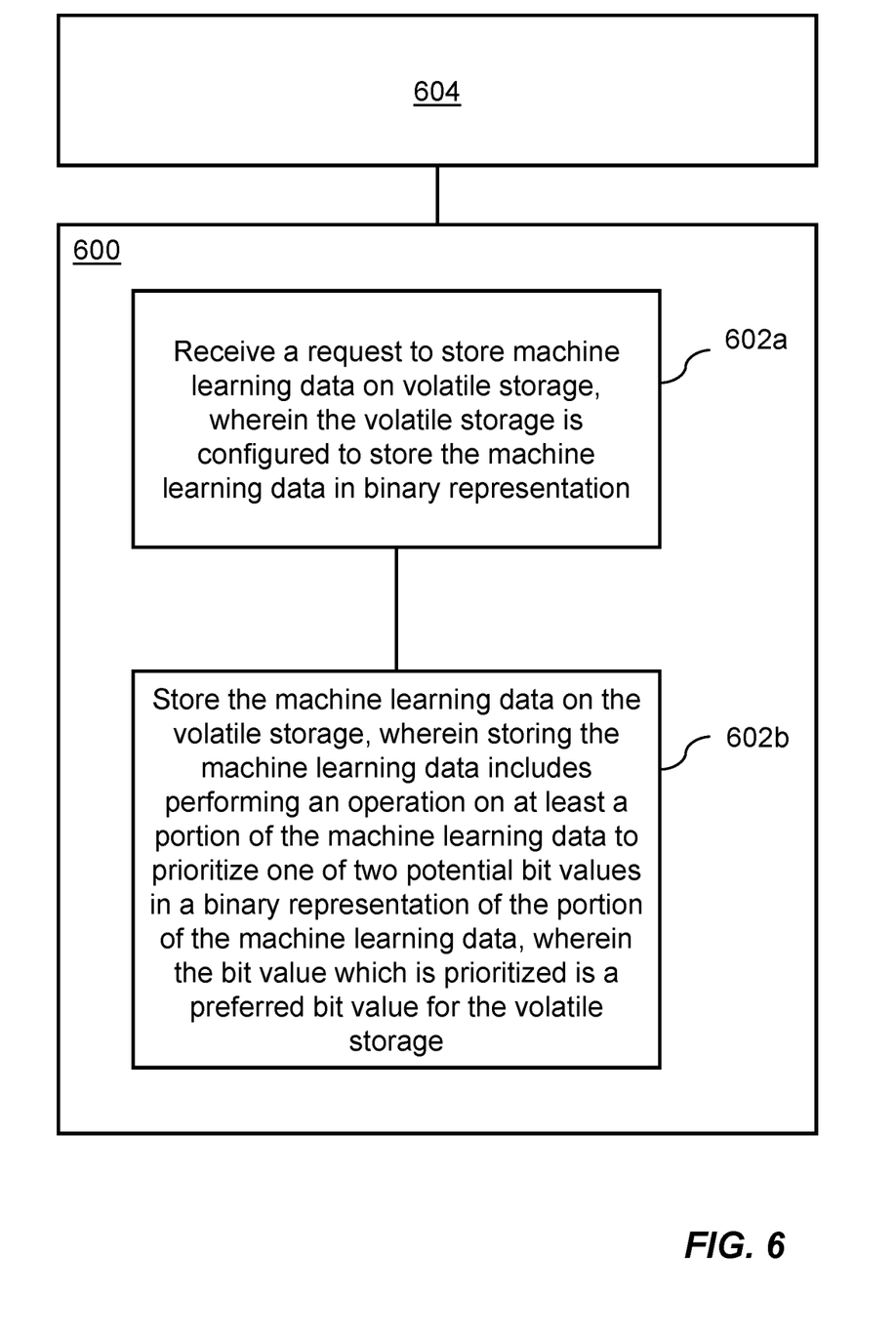
FIG. 6 is a schematic diagram of a non-transitory computer-readable storage medium according to examples.

FIG. 6 shows a non-transitory computer-readable storage medium 600 comprising computer-executable instructions 602a and 602b. The computer-executable instructions 602a and 602b when executed by a processor 604, cause the processor 604 to perform a method 200. The method 200 includes, at a first block 602a, receiving a request to store machine learning data 108 on volatile storage 104, the volatile storage 104 being configured to store the machine learning data 108 in binary representation. At a second block 602b, the method includes storing the machine learning data 108 on the volatile storage 104. Storing the machine learning data 108 includes performing an operation on at least a portion of the machine learning data 108 to prioritize one of the two potential bit values in a binary representation of the portion of the machine learning data 108. The bit value which is prioritized is a preferred bit value for the volatile storage 104.

Figure 7:
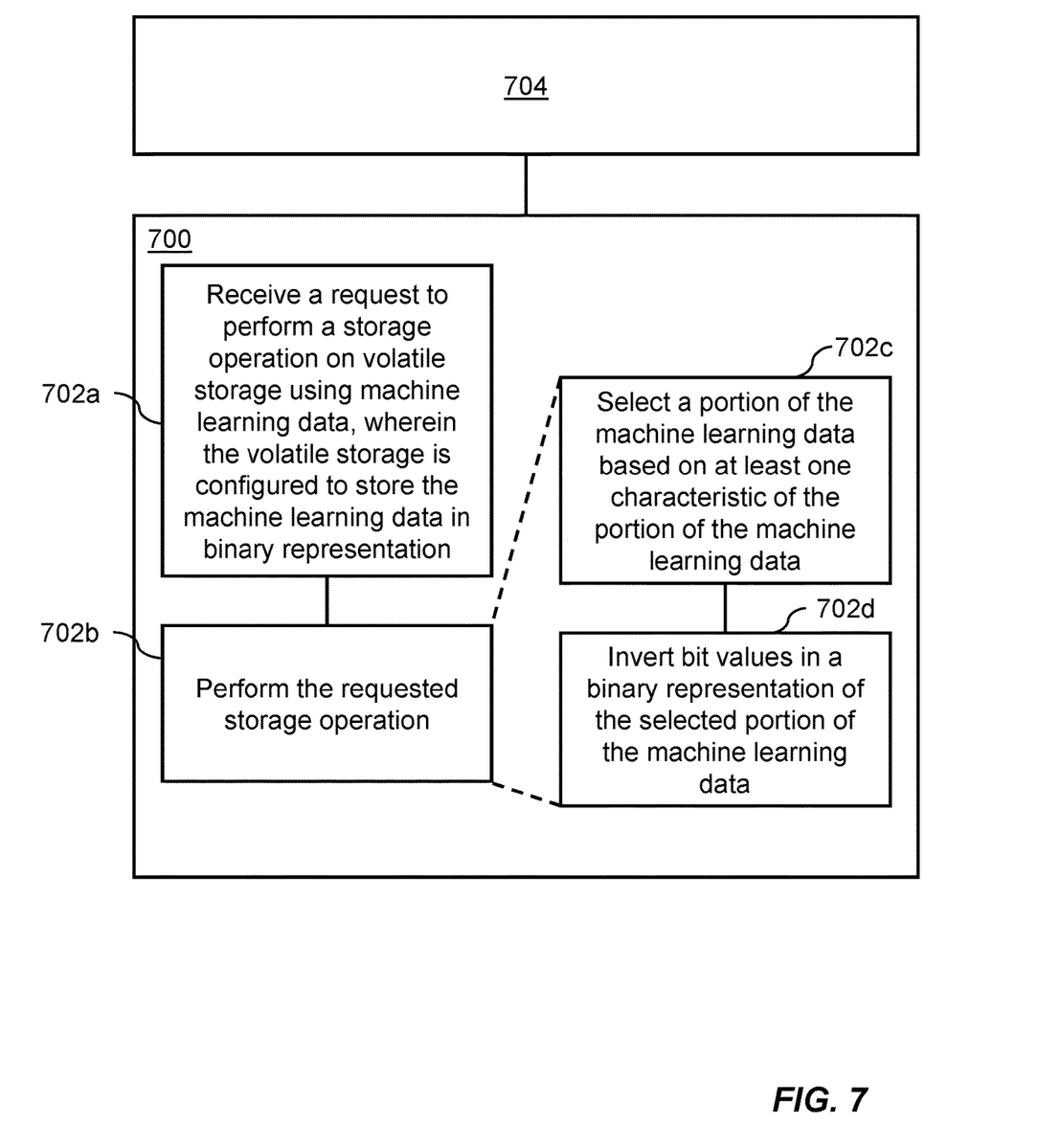
FIG. 7 is a schematic diagram of a non-transitory computer-readable storage medium according to examples.

FIG. 7 shows a non-transitory computer-readable storage medium 700 comprising computer-executable instructions 702a to 702d. The computer-executable instructions 702a to 702d when executed by a processor 704, cause the processor 704 to perform a method 400. The method 400 includes, at a first block 702a, receiving a request to perform a storage operation on volatile storage 104 using machine learning data 108. At a second block 702b, the method comprises performing the requested storage operation. Performing the requested storage operation includes, at block 702c, selecting a portion of the machine learning data 108 based on at least one characteristic of the portion of the machine learning data 108, and, at block 702d, inverting bit values in a binary representation of the selected portion of the machine learning data 108.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A processing unit comprising:
   volatile storage for storing machine learning data, wherein the volatile storage is configured to store machine learning data in binary representation;
   a data processing engine communicatively coupled to the volatile storage and for performing machine learning operations using the machine learning data,
   wherein the processing unit is configured to selectively invert bit values in binary representations of portions of the machine learning data when performing storage operations using the volatile storage by:
      processing the machine learning data to obtain a selected portion of the machine learning data and one or more unselected portions of the machine learning data, wherein the selected portion is selected based on at least one characteristic of the selected portion of the machine learning data; and
      selectively inverting bit values by inverting at least one bit value in a binary representation of the selected portion of machine learning data and without inverting bit values in binary representations of the unselected portions of the machine learning data,
wherein the storage operations comprise at least one of:
writing the selected and unselected portions of the machine learning data to the volatile storage; and
reading the selected and unselected portions of the machine learning data from the volatile storage.

2. The processing unit of claim 1, wherein the machine learning data comprises any of:
weight data including weight values representing elements in at least one kernel;
input feature map data including a first set of one or more data values;
output feature map data including a second set of one or more data values;
input data including a third set of one or more data values; and
output data including a fourth set of one or more output data values.

3. The processing unit of claim 1, wherein the selected portion of machine learning data comprises weight data representing a layer of a neural network to be implemented by the data processing unit.

4. The processing unit of claim 1, wherein the selected portion of machine learning data comprises any of:
input data representing an input to a neural network;
input feature map data representing at least one input feature map;
output feature map data representing at least one output feature map; and
output data representing an output of the neural network.

5. The processing unit of claim 1, wherein the at least one characteristic of the selected portion of machine learning data comprises any of:
a data type of the selected portion of machine learning data;
information represented by the selected portion of the machine learning data; and
operations to be performed on the selected portion of machine learning data.

6. The processing unit of claim 1, wherein selectively inverting bit values in the binary representations of the portions of machine learning data comprises inverting bit values in the binary representations of portions of machine learning data based on at least one characteristic of the volatile storage.

7. The processing unit of claim 1, wherein the processing unit comprises a data inversion unit connected at one or more interfaces of the volatile storage for inverting bit values in binary representations of portions of machine learning data.

8. The processing unit of claim 7, wherein the data inversion unit comprises an Exclusive OR, XOR, gate.

9. The processing unit of claim 7, wherein the processing unit comprises a control unit adapted to control the data inversion unit to selectively invert bit values in binary representations of portions of the machine learning data.

10. The processing unit of claim 9, wherein the control unit is adapted to:
select a said portion of the machine learning data based on at least one of:
a characteristic of the machine learning data; and
a characteristic of the volatile storage; and
control the data inversion unit to invert one or more bit values in a binary representation of the selected said portion of machine learning data.

11. The processing unit of claim 10, wherein the processing unit determines one or more characteristics of the volatile storage based on at least one of:
an indication of the one or more characteristics of the volatile storage stored in a register included in the processing unit;
an input to the processing unit comprising an indication of one or more characteristics of the volatile storage.

12. A computer-implemented method for data processing, the computer-implemented method comprising:
receiving a request to perform a storage operation on volatile storage using machine learning data, wherein the volatile storage is configured to store the machine learning data in binary representation; and
performing the requested storage operation,
wherein performing the requested storage operation includes:
obtaining a selected portion of the machine learning data and one or more unselected portions of the machine learning data, wherein the selected portion is selected
based on at least one characteristic of the selected portion of the machine learning data; and
selectively inverting bit values of the machine learning data by inverting bit values in a binary representation of the selected portion of the machine learning data and without inverting bit values in binary representations of the unselected portions of the machine learning data,
wherein the requested storage operation comprises at least one of:
writing the selected and unselected portions of the machine learning data to the volatile storage; and
reading the selected and unselected portions of the machine learning data from the volatile storage.

13. The computer-implemented method of claim 12, wherein the at least one characteristic of the selected portion of the machine learning data comprises any of:
a data type of the selected portion of machine learning data;
information represented by the selected portion of the machine learning data; and
operations to be performed on the selected portion of machine learning data.

14. The computer-implemented method of claim 12, wherein the method includes selecting the portion of the machine learning data based on at least one characteristic of the portion of machine learning data and at least one characteristic of the volatile storage.

15. The computer-implemented method of claim 14, wherein the characteristic of the volatile storage includes a difference between energy consumption when reading or writing a bit value of one from the volatile storage and when reading or writing a bit value of zero from the volatile storage.

16. A computer-implemented method for data processing, the computer-implemented method comprising:
receiving a request to store machine learning data on volatile storage, wherein the volatile storage is configured to store the machine learning data in binary representation; and
storing the machine learning data on the volatile storage, wherein storing the machine learning data includes:
obtaining a selected portion of the machine learning data and one or more unselected portion of the machine learning data, wherein the selected portion is selected based on at least one characteristic of the selected portion of the machine learning data;

selectively inverting bit values of the machine learning data by inverting bit values in a binary representation of the selected portion of the machine learning data to prioritize one of two potential bit values in the binary representation of the selected portion of the machine learning data and without inverting bit values in binary representations of the unselected portions of the machine learning data, wherein the bit value which is prioritized is a preferred bit value for the volatile storage.

17. The computer-implemented method of claim 16, wherein the preferred bit value for the volatile storage is a first bit value of the two potential bit values which causes less energy to be dissipated when read from the volatile storage than a second bit value of the two potential bit values.

* * * * *